United States Patent [19]

Monod et al.

[11] Patent Number: 5,293,400
[45] Date of Patent: Mar. 8, 1994

[54] CONTACTLESS LINKING DEVICE FOR INTERCONNECTING DATA BUS SECTIONS

[75] Inventors: Marie-Odile Monod, Saint Aubin; Jean-Luc Lablee, Chaingy, both of France

[73] Assignee: Centre National Du Machinisme Agricole, Du Genie Rural, Des Eaux Et Des Forets, Antony, France

[21] Appl. No.: 701,839

[22] Filed: May 17, 1991

[30] Foreign Application Priority Data

May 18, 1990 [FR] France ................................ 90 06273

[51] Int. Cl.$^5$ .......................... H04L 5/14; H04B 5/00
[52] U.S. Cl. .......................................... 375/7; 375/36; 370/32; 379/55; 455/41
[58] Field of Search .................... 375/7, 8, 36, 121; 370/32; 455/41; 379/55; 340/505, 825.54

[56] References Cited

U.S. PATENT DOCUMENTS

| | | | |
|---|---|---|---|
| 4,550,444 | 10/1985 | Uebel | 455/41 |
| 4,654,880 | 3/1987 | Sontag | 455/41 |
| 4,792,965 | 12/1988 | Morgan | 455/41 |
| 4,893,118 | 1/1990 | Lewiner et al. | 340/825.54 |
| 5,041,826 | 8/1991 | Milheiser | 455/41 |
| 5,049,856 | 9/1991 | Crossfield | 340/505 |
| 5,070,500 | 12/1991 | Horinouchi et al. | 455/41 |
| 5,124,870 | 6/1992 | Toyoda | 360/123 |

FOREIGN PATENT DOCUMENTS

| | | |
|---|---|---|
| 231413 | 12/1987 | European Pat. Off. . |
| 285477 | 10/1988 | European Pat. Off. . |
| 374018 | 6/1990 | European Pat. Off. . |
| 2433200 | 7/1980 | France . |
| 57-132460 | 8/1982 | Japan . |
| 0090437 | 5/1985 | Japan ................................ 455/41 |
| WO89/10651 | 2/1989 | PCT Int'l Appl. . |

Primary Examiner—Stephen Chin
Assistant Examiner—Young Tse
Attorney, Agent, or Firm—Staas & Halsey

[57] ABSTRACT

The device serves to interconnect first and second sections of a data bus in order to provide a transparent bi-directional data transmission along the bus comprised of the two sections, irrespective of the protocol used. Basically, the device includes a first transmitter-receiver module at which terminates a first bus section, and a second transmitter-receiver module at which terminates a second bus section. Both modules are disposed face-to-face without contact and are electromagnetically coupled. Each receiver module has a circuit for supplying a transmitting coil with a signal modulated by the data to be transmitted and coming from the bus section to which the module is connected, and a detector circuit for receiving a modulated signal from the same coil to produce the data to be transmitted to the bus section to which the module is connected. In each transmitter-receiver module, the same coil used for transmission and reception is in the form of one and the same flat spiral winding, the windings of the first and second modules facing each other and having substantially aligned axes.

7 Claims, 4 Drawing Sheets

CONTACTLESS LINKING DEVICE FOR INTERCONNECTING DATA BUS SECTIONS

BACKGROUND OF THE INVENTION

1. Field of the Invention

The present invention relates to a contactless linking device for interconnecting sections of a data bus and, more particularly, to sections of a differential or non-differential bifilar EIA standard data bus.

The field of the invention covers bi-directional data transmissions between two devices, and in particular between two devices that are mutualy isolated, or mobile with respect to each other, or that must be easily separable from each other.

Typical applications for the invention include data transfer across a sealed wall between one zone confined within a hostile environment, e.g. premises inside a nuclear or chemical plant, and another zone in a non-hostile environment, or data transfer between physically separated devices that are both inside a hostile environment, for instance between two submerged devices, or again for data transfer across a non-metallic wall, such as a window or skin, without structurally altering the wall.

The invention can also be used in all instances where a contactless link can advantageouly replace a data transmission link by a connector and/or a flexible connection between two separate or relatively movable devices.

This is the case with connectors that are frequently manipulated (e.g. in medical apparatus) or that are submitted to harsh operating conditions (high humidity, corrosive atmospheres, mud, dust, vibrations . . .), as a result of which there occurs a rapid deterioration of the contacts. There is a similar problem with flexible connections between movable devices. In this case the connections restrict, and can even hinder, relative movements between the contacting portions, and are also more easily damaged.

In particular, the invention can be used in robotics for data transfer between the different movable elements of a robot employed in the car industry, or for data transfer between different parts of a vehicle, or between a towing vehicle and its trailer, or again in the field of agricultural machinery, for data transfer between a tractor and a farming tool or a towed machine.

2. BACKGROUND OF THE RELATED ART

There is described in document JP-A-57-132460 a linking device between a first electrical circuit receiving binary data and a second electrical circuit equipped with data processing means. A common isolation transformer is used for transmitting both the data signals and the energy necessary for powering the second circuit. The primary of the transformer receives a signal modulated by the data to be transmitted. The signal drawn from the secondary of the transformer supplies a rectifier circuit that delivers the supply voltage for the second circuit and is applied to a demodulator. The latter extracts the data and a clock for transmission to the processing means.

Such a device provides only an electrical insulation and does not constitute a contactless link, i.e. a physically separated link between the first and circuits.

Moreover, the aforementioned device introduces a phase shift that makes it quite inappropriate for linking two bus sections in a "transparent" manner, i.e. without interfering with the data transmission protocol of the bus.

Document WO-A-8910551 teaches the concept of contactless transmission by means of a lossless oscillator circuit. When the latter is in the vicinity of a receiver comprising an analog resonator, it transmits energy to the receiver and can thus also send data thereto. The coils for the transmitter and receiver circuits can be planar printed circuits. No embodiment concerning the data transmission is given. Similarly, this document makes no mention of bi-directional data transmission between two sections of a data bus.

Document EP-A-0 285 477 describes a data transmission device operating between coupled vehicles, in which each vehicle is equipped with a transmitter-receiver unit in contactless coupling relation with the corresponding unit of the other vehicle, each unit being connected to an RS 485 type bus. The units are arranged such that the transmitter of one unit faces the receiver of the other unit, the transmitters and receivers of both units consisting of ferrite cores.

With such an arrangement, the transmitter of one unit has to be aligned with the corresponding receiver of the other unit in order to ensure proper data transmission. Any relative movement between the vehicles that is not parallel to the axis of the transmitter-receiver pairs causes a mis-alignment in at least one of the pairs.

Accordingly, the device of document EP-A- 0 285 477 not only calls for a very precise positioning between the two units, but also prohibits relative movements of substantial amplitude between them.

SUMMARY OF THE INVENTION

The present invention proposes a contactless linking device for interconnecting data bus portions so as to allow data transmission along one direction or the other in a transparent manner—in other words, as if the bus were un-interrupted—irrespective of the transmission protocol used on the bus.

Another object of the invention is to provide a linking device that can tolerate some mis-alignment and allows relative displacement between the two interconnected circuits.

This object is achieved according to the present invention by means of a device comprising:

A first transmitter-receiver module at which terminates a first bus section, and a second transmitter-receiver module at which terminates a second bus section, said modules being disposed face-to-face without contact and being electromagnetically coupled to each other, each transmitter-receiver module includes coil means, modulation means having an input connected to the bus section to which the module is connected and an output connected to the coil means for supplying the latter with a signal modulated by data to be transmitted and issues from the bus section to which the module is connected, detection means having an input connected to the coil means and an output connected to the bus section to which the module is connected for receiving a modulated signal from the coil means and deriving from said modulated signal data to be supplied to the bus section to which said module is connected, wherein, in each transmitter-receiver module, said coil means is in the form of one and the same flat spiral winding acting both as a transmitting and receiving coil, the spiral winding of the first module and the spiral winding of the second module facing each other and having substantially aligned axes to ensure electromagnetic coupling between the modules.

Advantageously, each transmitter-receiver module comprises echo-suppression means for preventing a re-injection into the bus portion to which it is attached of the data issuing from that bus portion and intended to be sent to the other transmitter-receiver module.

The embodiment disclosed herein introduces no phase shift that could affect the data bus transmission protocol, even at relatively high data rates.

Moreover, the use of a single transmitting and receiving coil in the form of a flat spiral winding offers significant advantages.

Firstly, it provides tolerance to relatively large misalignments between the transmitter-receiver modules.

Secondly, the devices fitted with such transmitter-receiver modules can be rotated about an axis coincident with—or close to—the axis joining the two mutually confronting windings without affecting the data transmissions. This is not the case when data transmissions along the two directions follow parallel yet distinct paths, as in the case of the device disclosed in document EP-A- 0 285 477.

Thirdly, the flat winding that simultaneously constitutes the transmitting coil and the receiving coil can be produced as a printed circuit element, allowing for a compact arrangement , e.g. in the form of a board. In particular, it becomes possible to form the winding on the printed circuit board around the other components forming the transmitter-receiver module.

According to a first embodiment of the invention, both transmitter-receiver modules are "active" devices, i.e. they each have an electrical energy source.

According to a second embodiment of the invention, one of the modules, e.g. the first, is active whilst the other is "passive", i.e. it does not have its own electrical energy source.

An active transmitter-receiver module comprises modulation means receiving data to be sent and includes at least one oscillator connected to the winding. Various known forms of modulation may be used: amplitude modulation, frequency modulation, or phase modulation.

In a passive transmitter-receiver module, the energy necessary to operate the module is drawn from the energy field radiated from the winding of the active module to which the passive module is coupled, whether there is data transmission or not.

Other features and advantages of the present invention shall become more apparent from reading the following description, given as a non-limiting example, with reference to the drawings.

DESCRIPTION OF THE PREFERRED EMBODIMENTS OF THE INVENTION

Figure 1:
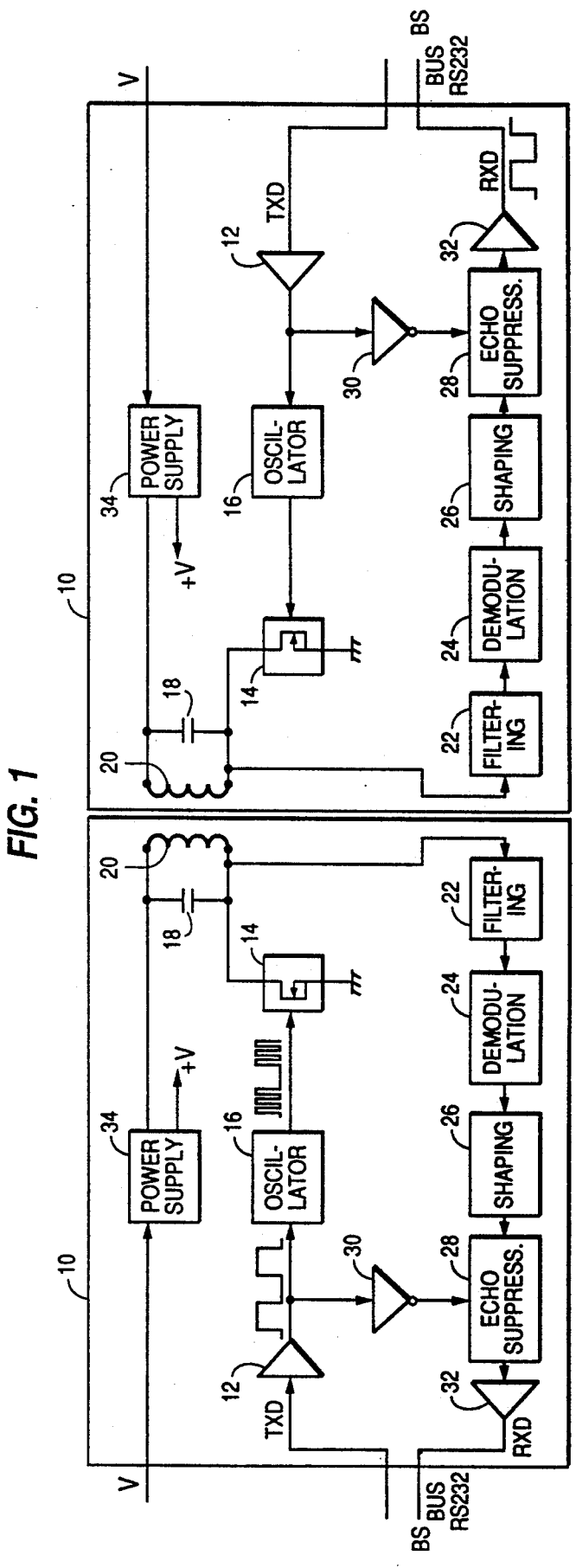
FIG. 1 is a circuit diagram of an embodiment of a linking device according to the invention.

The linking device illustrated in FIG. 1 consists of two identical transmitter-receiver modules 10, each connected to a respective section of a data bus BS. In the example, the bus BS is a half-duplex RS 232 bifilar serial bus. The modules 10 are intended to form a contactless link between two sections of the bus BS so as to ensure transparency of data transmission on the bus BS, i.e. they act as if the latter were un-interrupted.

The transmitting portion of each module 10 comprises a transmission input TXD connected to a bus driving circuit 12. Digital data in binary form received on the section of the bus connected to the module 10, at the output of circuit 12, are applied at the control input of a high-frequency oscillator 16. In the present example, the output signal from the oscillator, which is in the form of high-frequency pulses, is amplitude modulated by the data to be transmitted. The modulated signal is applied to a static switch 14, such as a field effect transistor connected in series with a winding 20 between the ground and a terminal raised to a winding supply voltage. A capacitor 18 is connected in parallel with the winding 20, forming an LC circuit with the latter.

In each module 10, one and the same winding 20 is used as the transmitting coil and the receiving coil which is electromagnetically coupled to the winding 20 of the other module.

The receiving portion of each module comprises a filter circuit 22 that receives, after an optional clipping stage, the modulated signal transmitted from winding 20 of the other module. The output signal from the filter circuit 22 is demodulated by means of a demodulator circuit 24, and is then shaped by a Schmidt trigger circuit 26 or the like. The pulses generated by the shaping circuit 26, which correspond to the digital data received from the other module, are applied at the receiver output RXD via an echo suppression gate circuit 28 and a bus driving circuit 32. The echo suppression circuit 28 consists of a logic gate circuit controlled by the output of circuit 12 via an inverter 30.

The transmitter input TXD and the receiver output RXD are connected to the bus section to which the module is joined. A power supply circuit 34 running from an externally-supplied voltage V, e.g. from a rechargeable battery, supplies both the voltage +v necessary for operating the module's components and the voltage required for the the winding 20. The operation of the above-described linking device should be obvious from the foregoing. Each transmitter-receiver module 10 operates alternatively either as a transmitter or a receiver. When in the transmitter mode, the echo supression circuit 28 is controlled by the transmitted data so as to block the receiving channel and thus prevent re-injection of these data into the portion of the bus from which they came.

Figure 2:
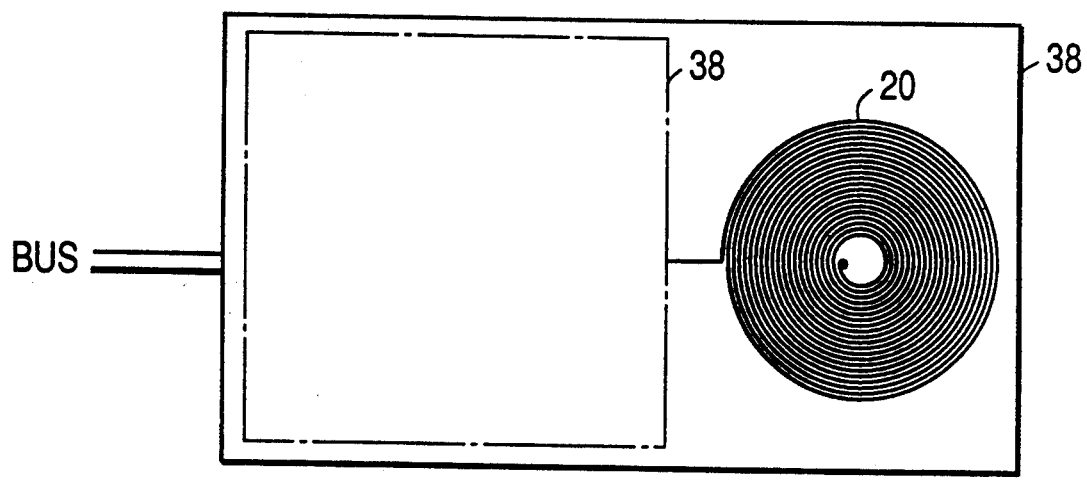
FIG. 2 is a simplified diagram showing the construction of a transmitter-receiver module of FIG. 1.

According to the invention, and as shown in FIG. 2, the transmitter-receiver winding 20 consists of a flat spiral winding. Advantageously, this winding 20 is printed on a circuit 36 in the form of a board. In the example shown, the latter includes, among other things, a zone 38 containing the other module components to which the winding is connected. The use of a printed circuit board allows the transmitter-receiver module to have a very compact design.

It is however possible to form the winding 20 on a support separate from the board containing the other module components, the two elements then being connected by a shielded cable. This solution could be used when the winding is to be in an environment that is hostile for the other components.

Preferably, the winding 20 is printed double-sided so as to increase the field strength, the spirals on each side being serially connected. A greater number of spirals can be provided with a multi-layer type of circuit, one spiral being printed on each layer.

The winding 20 can also be made on other supports, such as a ceramic substrate. In this case, the winding is formed e.g. by using a deposition process.

The coupling between the two transmitter-receiver modules is achieved by disposing the respective windings 20 so that they confront each other, i.e. in parallel planes with their axes substantially aligned.

Tests have been carried out with a linking device such as illustrated in FIGS. 1 and 2, the oscillator 16 supplying a signal at about 1MHz frequency, and the windings 20 consisting of 20 spires, with an outer diameter of 50 mm.

The linking device has proved to be easily capable of reaching a data flowrate of at least 300 kbits/s on an RS 232 type bus. Using an RS 485 bus as explained below, a flowrate of 150 kbits was reached without difficulty. In both cases, the protocol used (CAN protocol) was perfectly respected. The distance separating the windings 20 of the two modules was increased up to 2 cm without affecting the data transmission in any way.

Moreover, it has been observed that the device can tolerate a relatively large mis-alignment (up to 10 mm) between the two winding axes without incidence on the quality of transmission. An even larger mis-alignment could be permitted by increasing the size of at least one of the windings. At least one of the windings could then be formed on the printed circuit board not beside the other components on the board, but around them.

Figure 3:
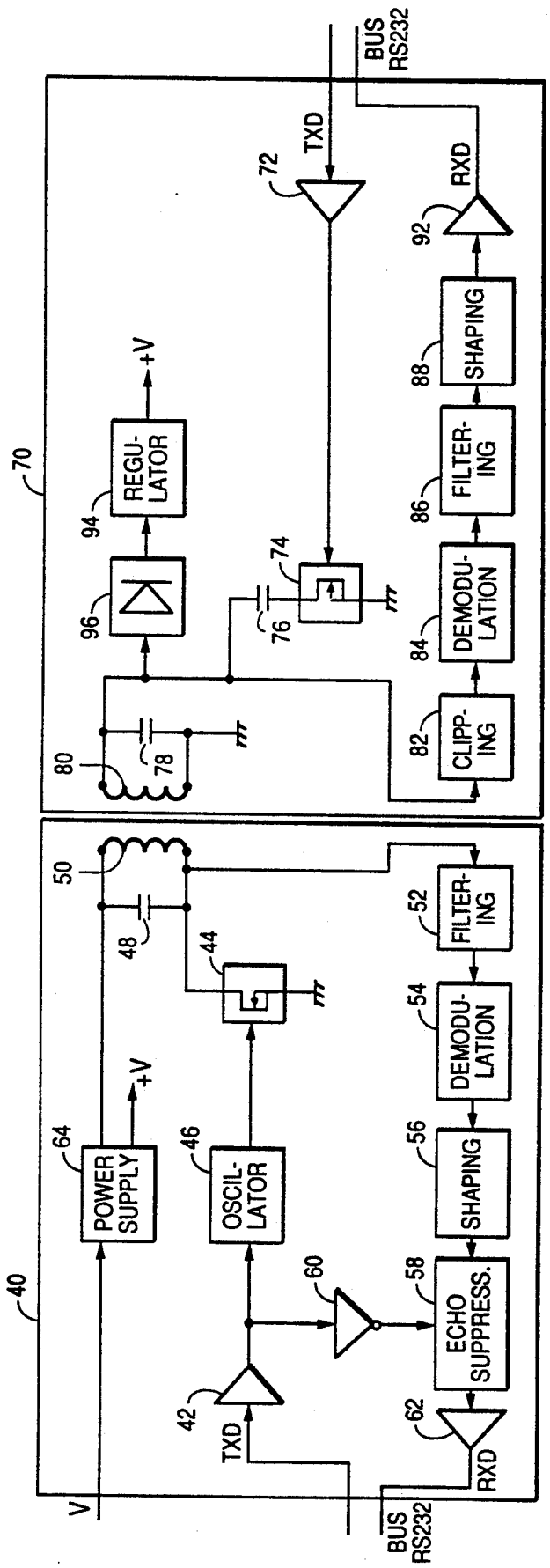
FIG. 3 is a circuit diagram of another embodiment of a linking device according to the invention.

FIG. 3 illustrates another embodiment of a linking device according to the invention which, instead of using two active modules (i.e. self-powered modules), uses one active module 40 and a passive module 70 devoid of an autonomous power supply.

The active module 40 is similar to those shown in FIG. 1. It comprises an oscillator 46 having a control input that receives the digital data for transmission from a bus driving circuit 42. The oscillator output signal, which is modulated by the data to be transmitted, controls a switch 44 connected in series with the winding 50 between the ground and a winding supply voltage. The winding 50 is in the form of a spiral analogous to the the one described above. A capacitor 48 is connected in parallel with the winding 50.

The signals received by the winding 50 are filtered by means of a filter 52, demodulated by a demodulator circuit 54 and shaped by a shaping circuit 56. The thus-derived digital data are sent along the bus section to which the, module 40 is connected, via an echo-suppression circuit 58 and a bus driving circuit 62. The echo-suppression circuit is controlled by the digital data sent out, via an inverter 60. A power supply circuit 64 delivers the operating voltage +v for the module components and the supply voltage for the winding 50. Circuits 42 and 62 are joined to the bus section to which the module 40 is connected.

The passive module 70 comprises a spiral winding 80 similar to winding 50, to which it is coupled. A capacitor 78 is connected in parallel with the winding 80.

The signal at the terminals of the winding 80 is rectified by means of a half-wave rectifier 96 whose output is applied to a voltage regulator 94 that delivers the supply voltage +v to the components of the passive module 70. Accordingly, the energy required for operating the passive module comes from the oscillator 46 of the active module, via windings 50 and 80, irrespective of whether or not data are being transmitted. In order to ensure optimum energy transfer, oscillator 46 supplies a signal at a frequency equal to the resonant frequency of the LC circuit formed by the winding 80 and the capacitor 78. Here, a frequency-stable oscillator should be used. A high stability is not however necessary when an active module is coupled to another active module.

The digital data signals delivered from a bus driving circuit 72 for transmission control a switch 74 consisting of a VMOS transistor. The latter is connected in series with a capacitor 76 to form a parallel circuit with capacitor 78. The closure of the switch thus puts capacitor 76 in parallel with capacitor 78 and de-tunes the resonator circuit formed with the latter and winding 80. This has for result a weakening of the signal detected by the winding 50 of the active module 40, so allowing the digital data to be received from the passive module 70.

In the receive mode, the passive module 70 uses a clipping circuit 82 connected to the winding 80. After clipping, the signals received by the winding 80 are demodulated by a demodulating circuit 84, filtered by means of a filtering circuit 86 and shaped by a shaping circuit 88. Circuits 72 and 92 are joined to the bus section to which the passive module is connected.

In order to minimize the energy consumption of the passive module, the latter is preferably constructed in CMOS technology.

Data transmission between an active module and a passive module is achieved in the same way as between two active modules, although the maximum distance separating the two modules would in this case be more limited.

Naturally, the invention can also be employed to form a bus having more than two sections, by using a number of the present modules configured in pairs of active/active modules or active/passive modules.

Figure 4:
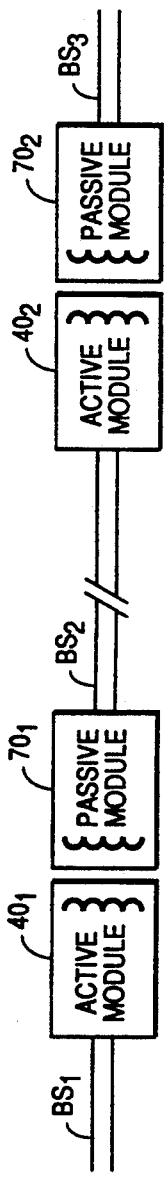
FIGS. 4 and 5 illustrate data transmission systems using pairs of transmitter-receiver modules, with each pair comprising an "active" module and a "passive" module.

For instance, FIG. 4 shows a pair consisting of an active module $40_1$ and a passive module $70_1$ respectively connecting first and second bus sections $BS_1$ and $BS_2$, and a second pair—also consisting of an active module $40_2$ and a passive module $70_2$ respectively connecting the second bus section $BS_2$ with a third bus section $BS_3$.

Figure 5:
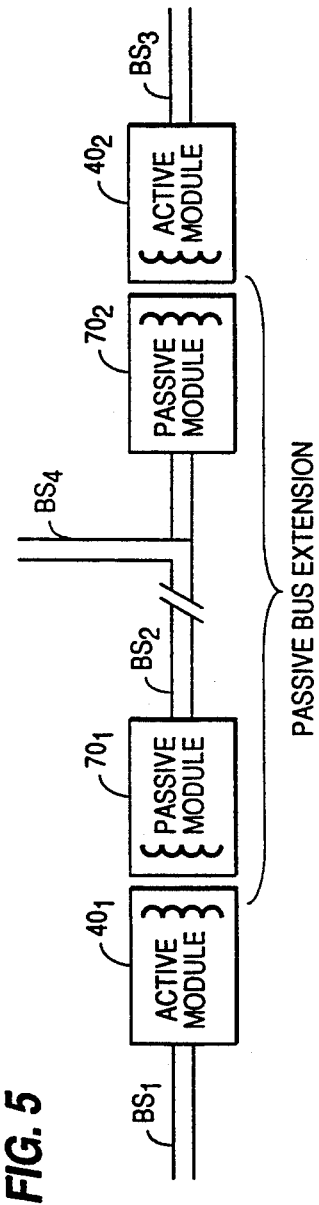

Similarly, FIG. 5 shows a pair consisting of an active module $40_1$ and a passive module $70_1$ respectively connecting first and second bus sections $BS_1$ and $BS_2$, and a second pair, inverted with respect to the first pair, consisting of a passive module $70_2$ and an active module $40_2$ respectively connecting the second bus section $BS_2$ with a third bus section $BS_3$.

The group formed by the serial connection of the passive module $70_1$, bus section $BS_2$ and the passive module $70_2$ constitutes a passive bus "extension".

One or several bus sections such as $BS_4$ can be branched off from the bus section $BS_2$ for connection to other bus sections using linking devices according to the present invention.

In the references to FIGS. 1 to 3, connection devices for an RS 232 type bus were considered.

Figure 6:
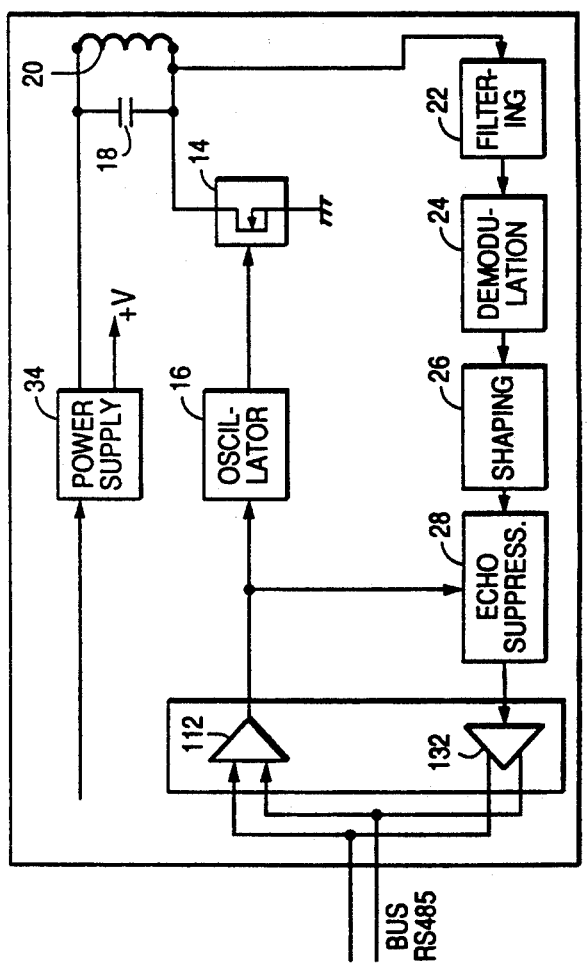
FIG. 6 is a circuit diagram of another embodiment.

But the invention can, of course, be applied to other EIA standard buses, differential or not. For instance, FIG. 6 shows an active module 100 according to the invention, destined for an RS 485 type bifilar serial bus. Apart from the bus driving circuits 112 and 132, which are specific to the RS 485 bus, the receiving and transmitting path circuits of module 100 are identical to those of the corresponding paths of module 10; they shall therefore not be described again (in FIG. 6, these circuits bear the same reference numerals as their counterparts in FIG. 2).

In contrast with the active module 10 of FIG. 1, it can be noted that the echo suppression circuit 28 of FIG. 6 is controlled directly by the digital signals corresponding to the data to be transmitted, due to the In the polarity of the signals on an RS 485 type bus. In the above-described circuits, transmission between the modules is achieved by amplitude modulation of the signals to be transmitted. Other known types of modulation, such as frequency or phase modulation, may be used instead.

If frequency modulation is chosen, a plurality of oscillator circuits can be provided for each of the active circuits.

What is claimed is:

1. A contactless linking device for interconnecting first and second bus sections of a data bus in order to provide a transparent bi-directional data transmission of data along the data bus, irrespective of protocol used, said contactless linking device comprising:
   a first transmitter-receiver module connected to the first bus section; and
   a second transmitter-receiver module connected to the second bus section, said first and second transmitter-receiver modules being disposed face-to-face without mutual contact;
   wherein each of said and second transmitter-receiver modules includes:
   a coil having first and second ends, the first end being connected to a fixed potential;
   modulation means having an input connected to one of the first and second bus sections and an output connected to the second end of said coil, for supplying said coil with a signal to be transmitted, modulated by first data received from said one of the first and second bus sections; and
   detection means having a detection input connected to the second end of said coil and a detection output connected to said one of the first and second bus sections, for receiving a modulated signal from said coil, for generating second data responsive to said modulated signal, and for transmitting said second data to said one of the first and second bus sections, and
   wherein said coil in each of said first and second transmitter-receiver modules comprises a flat spiral winding for transmitting and signal and receiving said modulated signal, and
   wherein said flat spiral winding of said first and second transmitter-receiver modules face each other and have axes substantially aligned to ensure electromagnetic coupling between the modules.

2. A contactless linking device as claimed in claim 1, wherein said detection means comprises echo-suppression means having a control input connected to said one of said first and second bus sections, for preventing reinjection into said one of said first and second bus sections of said first data received from said one of said first and second bus sections.

3. A contactless linking device as claimed in claim 1, wherein each of said first and second transmitter-receiver modules is an active module provided with an individual power supply circuit connected to an energy source.

4. A contactless linking device as claimed in claim 1, wherein one of said first and second transmitter-receiver modules is an active module comprising an individual power supply circuit connected to an energy source, and another of said first and second transmitter-receiver modules is a passive module comprising means connected to said coil for drawing energy from the active module.

5. A contactless linking device as claimed in claim 1, wherein said flat spiral winding comprises one printed circuit element.

6. A contactless linking device as claimed in claim 1, wherein said flat spiral winding comprises a plurality of serially connected printed circuit elements.

7. A contactless linking device as claimed in claim 1, wherein each of said first and second transmitter-receiver modules comprises a printed circuit board and said flat spiral winding comprises at least one printed circuit element formed around all other module components fitted on said printed circuit board.

* * * * *